US012384435B2

(12) United States Patent
Wydotis (10) Patent No.: US 12,384,435 B2
(45) Date of Patent: Aug. 12, 2025

(54) AUTOMATED COUNTERBALANCE SYSTEM AND METHOD FOR DETERMINING COUNTERBALANCE AND ADJUSTING COUNTERWEIGHTS OF A CROSSING GATE

(71) Applicant: Siemens Mobility, Inc., New York, NY (US)

(72) Inventor: Leonard Wydotis, Marion, KY (US)

(73) Assignee: Siemens Mobility, Inc., New York, NY (US)

( * ) Notice: Subject to any disclaimer, the term of this patent is extended or adjusted under 35 U.S.C. 154(b) by 966 days.

(21) Appl. No.: 17/445,748

(22) Filed: Aug. 24, 2021

(65) Prior Publication Data

US 2023/0073979 A1    Mar. 9, 2023

(51) Int. Cl.
| | |
|---|---|
| *B61L 29/08* | (2006.01) |
| *B61L 5/06* | (2006.01) |
| *B61L 29/04* | (2006.01) |
| *B61L 29/10* | (2006.01) |
| *B61L 29/16* | (2006.01) |
| *B61L 29/22* | (2006.01) |
| *B61L 29/30* | (2006.01) |
| *H02P 23/14* | (2006.01) |
| *H02P 25/03* | (2016.01) |

(52) U.S. Cl.
CPC ............. *B61L 29/08* (2013.01); *B61L 5/06* (2013.01); *B61L 29/04* (2013.01); *B61L 29/10* (2013.01); *B61L 29/16* (2013.01); *B61L 29/22* (2013.01); *B61L 29/30* (2013.01); *H02P 23/14* (2013.01); *H02P 25/03* (2016.02)

(58) Field of Classification Search
CPC .......... B61L 29/08; B61L 29/04; B61L 29/10; B61L 29/30; B61L 29/16; B61L 29/22; B61L 5/06; H02P 23/14; H02P 25/03
USPC ........................................ 246/240, 127, 125
See application file for complete search history.

(56) References Cited

U.S. PATENT DOCUMENTS

| 4,090,685 | A  | * | 5/1978 | Pappas | B61L 29/08 |
| | | | | | 49/140 |
| 7,384,017 | B1 | * | 6/2008 | Burke | B61L 29/04 |
| | | | | | 246/127 |
| 10,589,766 | B2 | | 3/2020 | Wydotis | |
| 2005/0284987 | A1 | * | 12/2005 | Kande | B61L 29/16 |
| | | | | | 246/125 |
| 2008/0093509 | A1 | * | 4/2008 | Woodlief | B61L 29/00 |
| | | | | | 246/473.1 |

(Continued)

FOREIGN PATENT DOCUMENTS

WO    WO-2019199310 A1 * 10/2019 ............. B61L 29/04

*Primary Examiner* — S. Joseph Morano
*Assistant Examiner* — James William Jones (57) ABSTRACT

An automated counterbalance system includes a crossing gate mechanism with an electric motor, a sensing device and a motor control unit, a crossing gate with a crossing gate arm and one or more counterweights, wherein the crossing gate arm is operated by the crossing gate mechanism, wherein the at least one sensing device is configured to monitor an electrical characteristic of the electric motor, and wherein the motor control unit comprises at least one processor and is configured to determine a counterbalance of the crossing gate based on the electrical characteristic of the electric motor and a movement of the crossing gate arm.

16 Claims, 4 Drawing Sheets

(56) References Cited

U.S. PATENT DOCUMENTS

2014/0312178 A1* 10/2014 Bohme .................. B61L 29/10
246/125
2018/0346003 A1* 12/2018 Wydotis ................. B61L 29/30
2019/0351926 A1* 11/2019 Ibarra .................... B61L 29/30

* cited by examiner

AUTOMATED COUNTERBALANCE SYSTEM AND METHOD FOR DETERMINING COUNTERBALANCE AND ADJUSTING COUNTERWEIGHTS OF A CROSSING GATE

BACKGROUND

1. Field

Aspects of the present disclosure generally relate to railroad crossing gates and, more particularly, to an automated digital counterbalance system and a method for determining counterbalance and adjusting counterweights of a crossing gate.

2. Description of the Related Art

At many roadway railroad crossings, pedestrian paths and sidewalks also cross the railroad track. Crossing gates, which typically are raised by default and lowered when a train approaches and crosses an intersection of a road and railroad track (i.e., a crossing), may be provided for roadway and pedestrian safety. In some instances, there may be separate gates for the roadway and the pedestrian path. For public safety reasons, it is essential that these crossing gates operate correctly.

Typically, railroad crossing gates utilize electrical and mechanical components to ensure that the gates perform their intended functions correctly. For example, gate arms are lowered using a motor located in a gate control mechanism. The same mechanism uses or is connected to counterweights to counterbalance the gate arms during movement of the arms. It is necessary to properly adjust the gate arm counterweights to achieve the proper horizontal and vertical torques as recommended by the motor's manufacturer. It is known that there is a direct correlation between improper torque adjustments and excessive motor current draw. If the counterweights are not adjusted correctly by the installer or maintainer of the crossing gate, and either the vertical or horizontal torques are not set properly, the gate motor will draw excessive current, which could lead to a motor and gate malfunction. As can be appreciated, this is undesirable.

SUMMARY

Briefly described, aspects of the present disclosure generally relate to railroad crossing gates and, more particularly, to an automated digital counterbalance system and a method for determining counterbalance and/or adjusting counterweights of a crossing gate. However, it should be noted that the automated digital counterbalance system and associated method may be used for other applications that include an electric machine and (counter-)weights.

A first aspect of the present disclosure provides an automated counterbalance system comprising a crossing gate mechanism comprising an electric motor with at least one sensing device and a motor control unit, a crossing gate comprising crossing gate arm and one or more counterweights, wherein the crossing gate arm is operated by the crossing gate mechanism, wherein the at least one sensing device is configured to monitor an electrical characteristic of the electric motor, and wherein the motor control unit comprises at least one processor and is configured to determine a counterbalance of the crossing gate based on the electrical characteristic of the electric motor and a movement of the crossing gate arm.

A second aspect of the present disclosure provides a method of determining counterbalance and/or adjusting counterweights of a crossing gate, the method comprising monitoring an electrical characteristic of an electric motor within a crossing gate mechanism of a crossing gate, moving a crossing gate arm by the crossing gate mechanism, and determining a counterbalance of the crossing gate based on the electrical characteristic of the electric motor and a movement of the crossing gate arm.

A third aspect of the present disclosure provides a non-transitory computer readable medium, storing computer executable instructions which, when executed by a computer, perform a method comprising monitoring an electrical characteristic of an electric motor within a crossing gate mechanism of a crossing gate while a crossing gate arm is moved by the crossing gate mechanism, and determining a counterbalance of the crossing gate based on the electrical characteristic of the electric motor during movement of the crossing gate arm.

DETAILED DESCRIPTION

To facilitate an understanding of embodiments, principles, and features of the present disclosure, they are explained hereinafter with reference to implementation in illustrative embodiments. In particular, they are described in the context of an automated counterbalance system and associated method, utilized for example in connection with railroad crossing gate applications.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
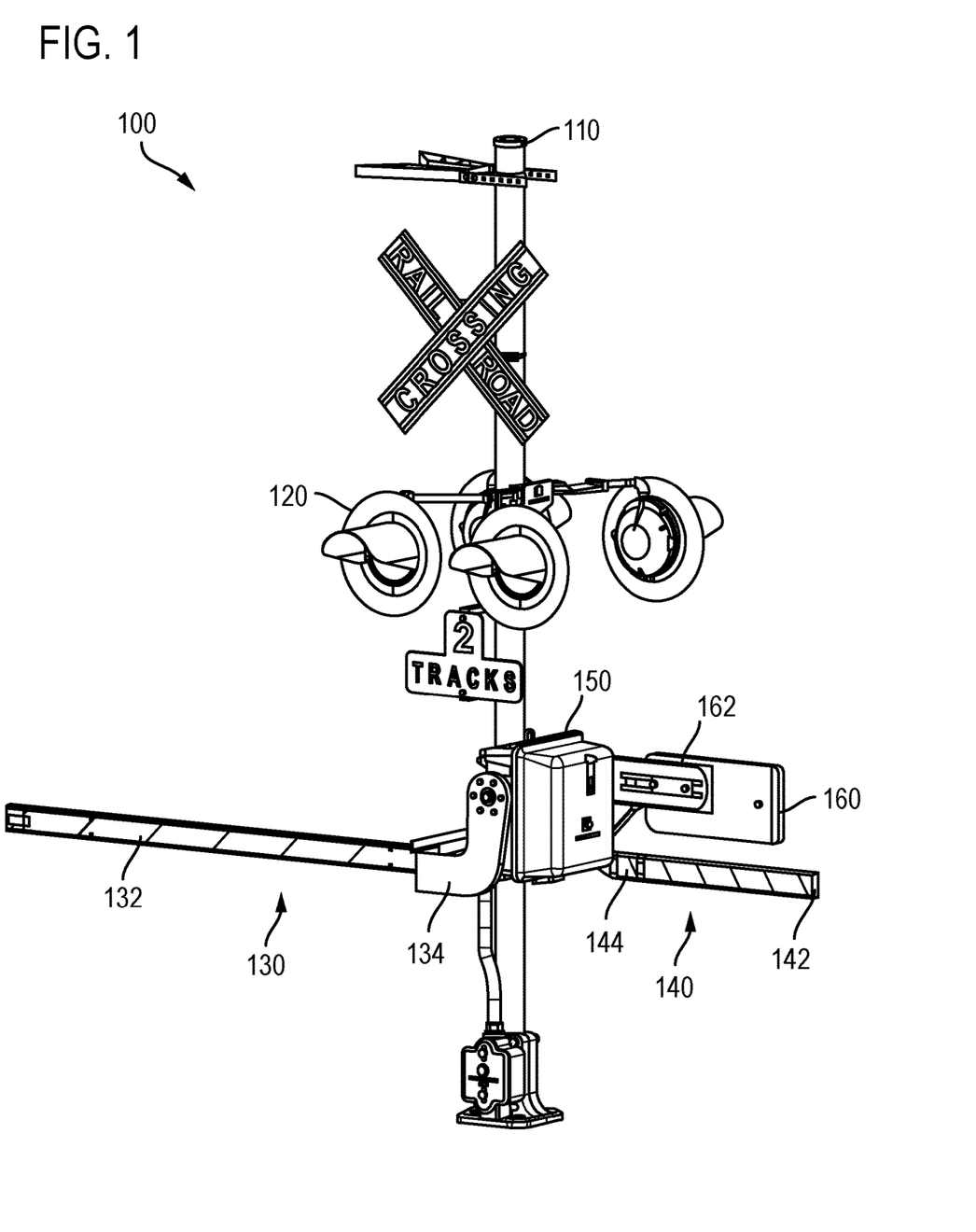
FIG. 1 illustrates an example railroad crossing gate in accordance with embodiments of the present disclosure.

FIG. 1 illustrates a railroad crossing gate 100 in a lowered or horizontal position. At many railroad crossings, at least one railroad crossing gate 100 may be placed on either side of the railroad track to restrict roadway traffic in both directions. At some crossings, pedestrian paths or sidewalks may run parallel to the roadway. To restrict road and sidewalk traffic, the illustrated railroad crossing gate 100 includes a separate roadway gate 130 and pedestrian gate 140. The roadway gate 130 and pedestrian gate 140 may be raised and lowered by the same gate control mechanism 150.

The example railroad crossing gate 100 also includes a pole 110 and signal lights 120. The gate control mechanism 150 is attached to the pole 110 and is used to raise and lower the roadway and pedestrian gates 130, 140. The illustrated railroad crossing gate 100 is often referred to as a combined crossing gate. When a train approaches the crossing, the railroad crossing gate 100 may provide a visual warning using the signal lights 120. The gate control mechanism 150 will lower the roadway gate 130 and the pedestrian gate 140 to respectively restrict traffic and pedestrians from crossing the track until the train has passed.

As shown in FIG. 1, the roadway gate 130 comprises a roadway gate support arm 134 that attaches a roadway gate arm 132 to the gate control mechanism 150. Similarly, the pedestrian gate 140 comprises a pedestrian gate support arm 144 connecting a pedestrian gate arm 142 to the gate control mechanism 150. When raised, the gates 130 and 140 are positioned so that they do not interfere with either roadway or pedestrian traffic. This position is often referred to as the vertical position.

A counterweight 160 is connected to a counterweight arm 162 connected to the gate control mechanism 150 to counterbalance the roadway gate arm 132. Although not shown, another counterweight could be provided to counterbalance the pedestrian gate arm 142.

Typically, the gates 130, 140 are lowered from the vertical position using a motor contained within the gate control mechanism 150. The motor drives gearing (not shown) connected to shafts (not shown) connected to the roadway gate support arm 134 and pedestrian gate support arm 144. The support arms 134, 144 are usually driven part of the way down by the motor (e.g., somewhere between 70 and 45 degrees) and then gravity and momentum are allowed to bring the arms 132, 142 and the support arms 134, 144 to the horizontal position. It should be appreciated that the arms 132, 142 when lowered will not always be exactly parallel with the ground when in the "horizontal position." As such, the final "horizontal position" of the arms 132, 142 may include deviations from a true parallel relationship with the ground. It should be appreciated that the arms 132, 142 when raised will not always be exactly perpendicular to the ground when in the "vertical position." As such, the final raised "vertical position" of the arms 132, 142 may include deviations from a true perpendicular relationship with the ground.

As noted, (highway) crossing gate mechanisms use a predetermined number of counterweights 160 on the opposite side of the crossing gate arm (away from the roadway on the opposite side of the mechanism's main shaft) to properly counterbalance the gate arm that extends over the roadway. To properly adjust the counterbalance of the gate arm, with the existing methods maintenance personnel must first determine the horizontal and vertical torque values for the arm and then adjust the counterweights laterally so both torque values are within the specifications defined by the gate manufacturer. These values vary considerably with different gate arm lengths. Proper adjustment of these torque values is critical to ensuring the gate functions as intended, in a reliable and fail-safe manner.

Known methods for determining and setting horizontal and vertical torque values on a crossing gate arm include (1) by using a spring scale attached to the gate arm itself and actually measuring the arm tension, or (2) by applying a specially-designed torque wrench to the gate mechanism's drive train or motor shaft. Neither method produces accurate results and both methods put the operator in danger. The first spring scale method requires that the user be in the roadway to apply the scale to the lowered (horizontal) gate arm and requires the user to be on a ladder to apply the spring scale to the raised (vertical) gate arm. The second torque wrench method requires the user to apply the torque wrench to the drive train inside the mechanism and operate the gearing to obtain the necessary readings, putting them at risk for severe injury as the gearing is moving while the operator is in close proximity to the moving gears as he is taking measurements.

Figure 2:
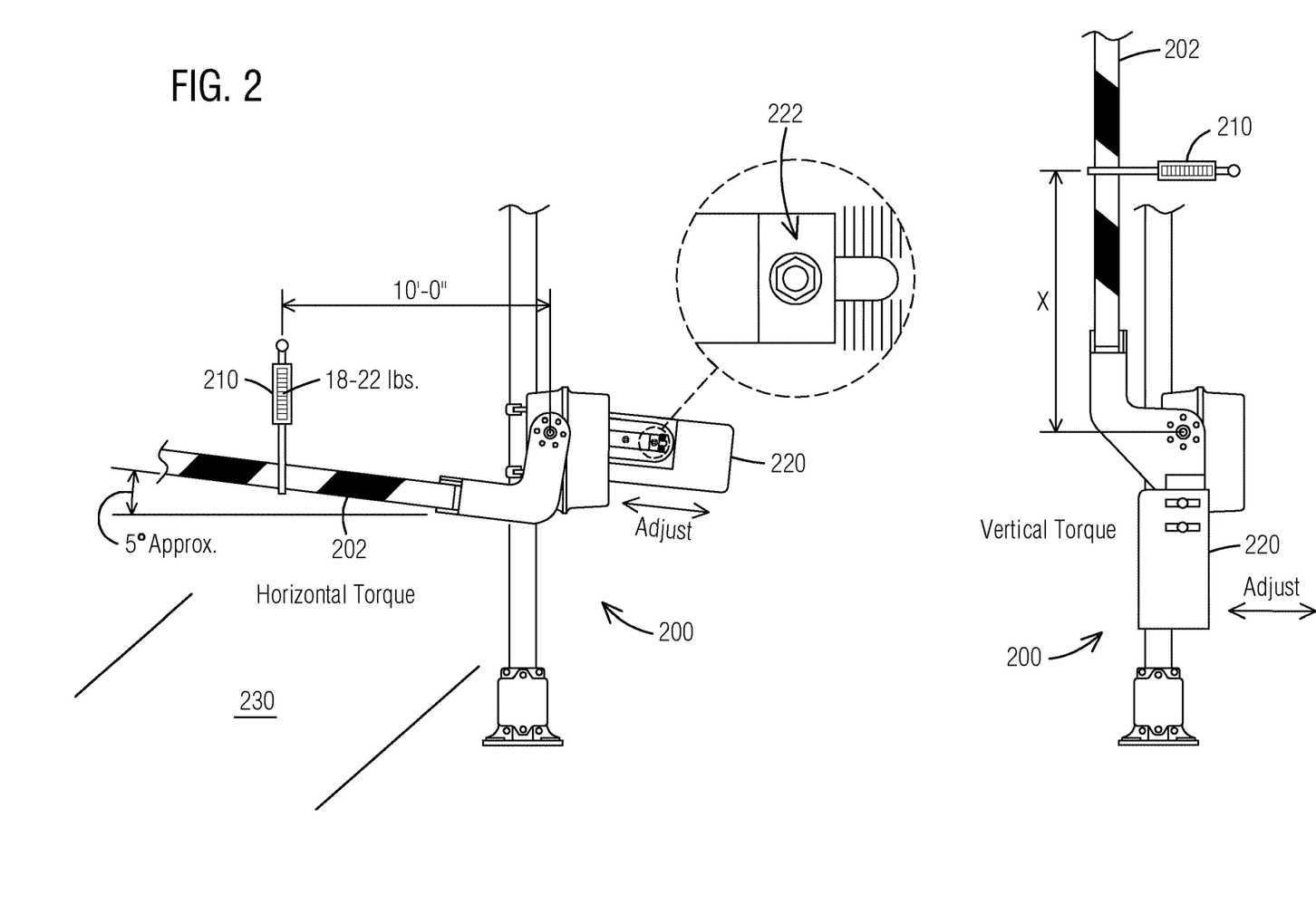
FIG. 2 illustrates an example for a known measurement and adjustment of counterweights of a crossing gate.

FIG. 2 illustrates an example for a known measurement and adjustment of counterweight(s) 220 of a crossing gate 200. Specifically, a method as shown in FIG. 2 includes using a spring scale 210 attached to the gate arm 202 itself and actually measuring arm tension.

Spring scale 210 is applied to crossing gate arm 202 to take the necessary readings and make the necessary counterweight adjustments. The gate 200 depicted on the left shows how the spring scale 210 is applied to the gate arm 202 to take horizontal measurements. Note that maintenance personnel must stand in the roadway 230 to take these measurements.

The gate depicted on the right shows how the spring scale 210 is applied to the gate arm 202 to take vertical measurements. Note that the maintenance personnel need to be on a ladder or have access to a bucket truck to take these measurements, which could be as high as 10 feet above the ground.

To adjust the counterweight(s) 220, the following steps may need to be performed: loosen inside nut 222, rotate locking piece 90°, slide counterweight(s), obtain torque, return locking piece, retighten nut 222.

Figure 3:
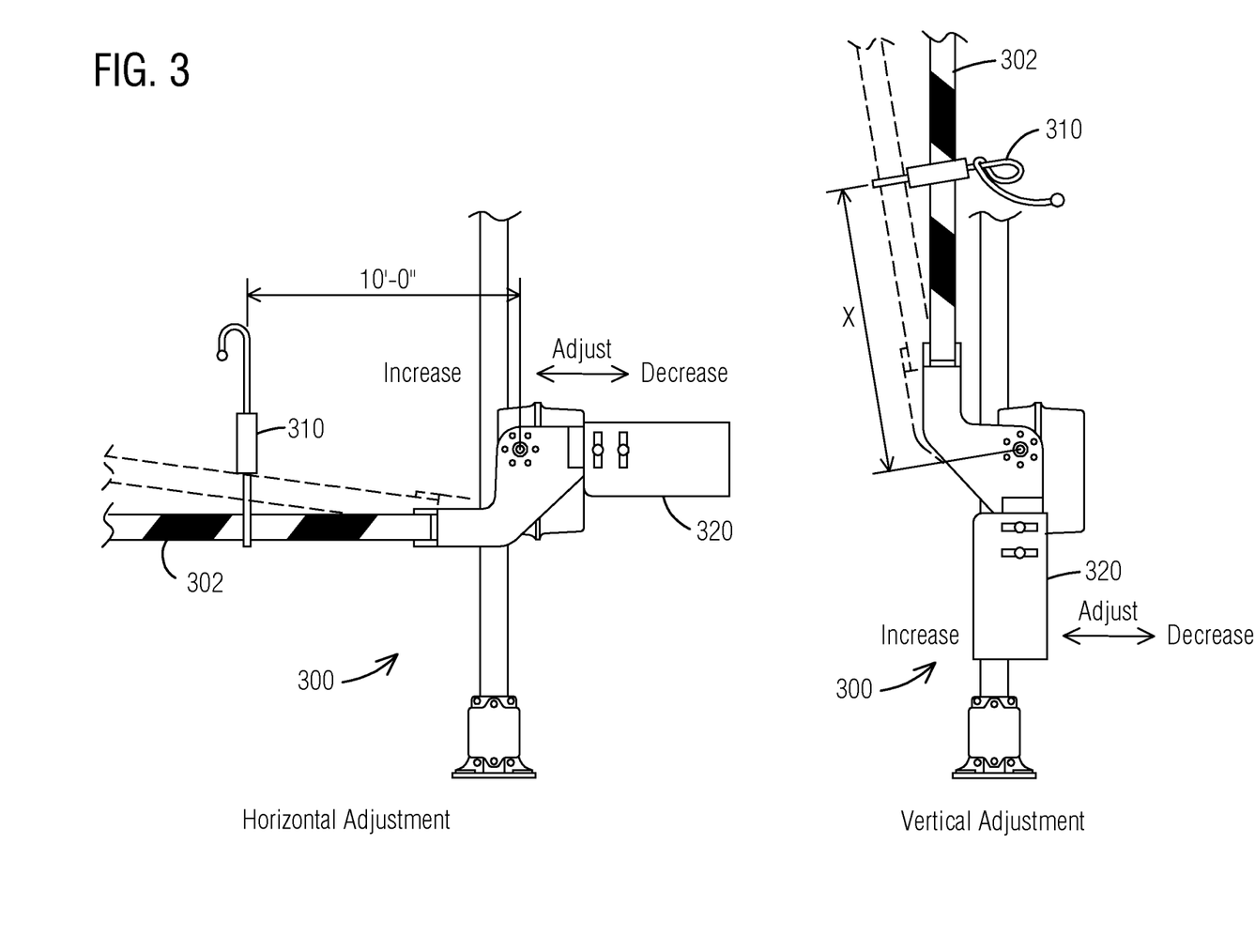
FIG. 3 illustrates another example for a known measurement and adjustment of counterweights of a crossing gate.

FIG. 3 illustrates another example for a known measurement and adjustment of counterweight(s) 320 of a crossing gate 300. Specifically, a method as shown in FIG. 3 includes using a spring scale 310 attached to the gate arm 302 itself and actually measuring arm tension. FIG. 3 shows how the spring scale 310 is applied to a different type of crossing gate 300 to take the necessary readings and make the necessary counterweight adjustments. The descriptions of the illustrations and safety hazards are identical to those defined with FIG. 2.

Another method for determining and setting horizontal and vertical torque values on a crossing gate arm is by applying a specially-designed torque wrench to the gate mechanism's drive train or motor shaft. The specially-designed torque wrench is applied to an internal drive train of the respective gate mechanism of the crossing gate arm. Although this method eliminates the need to apply the spring scale to the gate arm (for both horizontal and vertical measurements), it presents a different problem with regard to pinch point hazards which exist because the operator's hands are in close proximity to the rotating gears when the torque wrench is being applied.

In accordance with exemplary embodiments of the present disclosure, the provided automated digital counterbalance system and associated methods eliminate the need to take physical torque readings on the gate arm assembly or from the mechanism's drive train. The system and methods use electrical feedback from the electric motor of the crossing gate mechanism to determine the proper horizontal counterbalancing by measuring the rate of motor rotation (or acceleration) when the gate descends without power. Further, the system and methods use electrical feedback from the electric motor to determine the proper vertical counterbalancing by measuring the motor current level as the gate arm is ascending. With the proposed system and methods, the maintenance personnel are in a safe position, utilizing test functions on the gate mechanism, keeping them out of the roadway, off the ladder and away from the internal moving drive train components.

Figure 4:
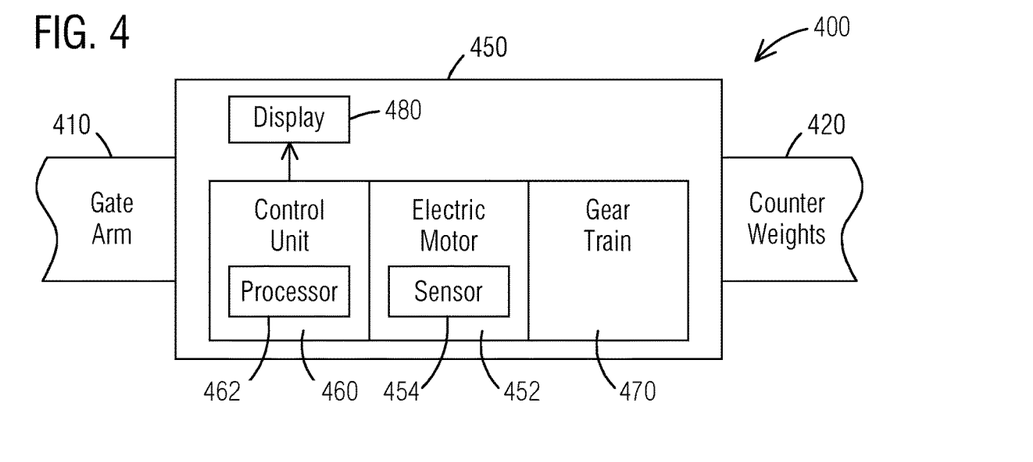
FIG. 4 illustrates a schematic diagram of an automated digital counterbalance system in accordance with embodiments of the present disclosure.

FIG. 4 illustrates a schematic diagram of an automated digital counterbalance system 400 in accordance with embodiments of the present disclosure. The automated digital counterbalance 400 may be included for example in a crossing gate 100 as illustrated in FIG. 1.

With reference to FIG. 2 and FIG. 3, when assessing why both horizontal and vertical torque readings have always been required, it really is very simple. Up until now there was no way to determine the proper balancing of a gate automatically so manual measurements had to be made. The "horizontal torque" is set at a predetermined level stated by the manufacturer to ensure that "under a loss of power condition, the gate will always descend from the vertical position to the horizontal position in no more than 20 seconds", meaning the counterweights are adjusted so the assembly is gate arm heavy. The 20 second maximum time requirement is required by the Federal Railroad Administration (CFR Title 49 Section 234) and is also a standard practice recommended by AREMA (Manual Part 3.2.15). The "vertical torque" measurement is required to make sure there is enough counterweight weight offsetting the weight of the arm so the gate mechanism can electrically raise the arm without doing too much work, i.e. the motor is not drawing too much current, which can damage a multitude of components within the gate mechanism.

The proposed system 400 and associated method take a much simpler approach to making sure the gate is properly balanced without having to take physical torque measurements of the gate assembly using a spring scale or torque wrench, and it does this irrespective of the gate arm length.

In accordance with an exemplary embodiment, the automated digital counterbalance system 400 comprises a crossing gate mechanism 450 comprising an electric motor 452 with at least one sensing device 454 and a motor control unit 460 with at least one processor 462, for example a microprocessor-based motor control board. Further, system 400 comprises a crossing gate arm 410 and one or more counterweight(s) 420. The crossing gate arm 410 is operated by the crossing gate mechanism 450. Specifically, the motor 452 drives a gear train 470 with one or more gears, connected to shaft(s) for operating the gate arm 410. It should be noted that the components of the system 400, in particular the gate arm 410 and counterweight(s) 420 are only shown schematically and are not drawn to scale.

The motor control unit 460 is operably coupled to the electric motor 452, and the control unit 460 controls/regulates the motor 452, e.g. sends control commands/signals to the motor 452 and receives motor feedback. Further, the control unit 460 provides power to the motor 452 for operation. Thus, the control unit 460 has information/data regarding operating voltage and current levels of the motor 452 as it operates. The electric motor 452 is electrically connected to the control unit 460 with a series of electrical wires to provide power to the electric motor 452 and feedback connections (motor speed, rotational angle, etc.) from the motor's sensor(s) 454 to the control unit 460.

In an example, the electric motor 452 is a brushless direct current (DC) motor and the at least one sensing devices comprises a Hall sensor. Specifically, the DC motor is equipped with one or more internal Hall sensor(s).

At least one sensing device 454 is configured to monitor one or more electrical characteristic(s) of the electric motor 452. The motor control unit 460 is configured to determine a counterbalance of the crossing gate arm 410 based on the electrical characteristic(s) and movement of the crossing gate arm 410. The system 400 utilizes the control unit 460 to analyze different aspects of motor performance to determine the proper settings of the counterweights 420, in both the horizontal and vertical positions, to achieve optimum gate performance.

Horizontal Counterbalancing

To ensure the horizontal counterbalance of the gate arm 410 is within specification, i.e. the gate arm 410 descends within 20 seconds under a loss of power condition, the motor control unit 460 is configured to determine a motor speed by using feedback from at least one sensing device 454, e.g. Hall sensor, and to compare the motor speed to an angular displacement of the gate arm 410 as it rotates downward to determine whether the arm 410 is moving too fast or too slow. The counterbalance of the crossing gate arm 410 is determined by a motor rotation rate as a function of time. The motor rotation rate as a function of time provides whether the crossing gate arm 410 is descending within or at a predefined period (time). Further, the motor control unit 460 is configured to determine and output a signal if the crossing gate arm 410 is descending above or below the predefined period.

As an example, the crossing gate mechanism 450 may comprise a 240:1 gear ratio, via gear train 470, from the electric motor 452 to a main shaft of the mechanism 450. The main shaft rotates 90 degrees (or ¼ of a full rotation) when the gate arm 410 transitions from a raised to a lowered gate position, therefore the motor 452 must rotate 240× 0.25=60 revolutions. If the gate arm 410 must descend in 20 seconds, then the motor 452 must rotate 1.5 rotations per degree of gate arm movement (90 degrees/60 rotations=1.5 degrees per rotation). The control unit 460 is configured to monitor a number of motor rotations as a function of time based on feedback from the at least one sensing device 454 (hall sensor). Thus, the system 400, specifically the gate mechanism 450, can be programmed to run through a test cycle where it raises the gate arm 410 to the vertical position and then drops the gate 410 without power. As the gate 410 is descending, the control unit 460 is measuring or determining the motor rotation rate as a function of time to determine whether the gate arm 410 is moving too fast or too slow.

According to an embodiment, the motor control unit 460 is configured to determine and output a signal if the crossing gate arm 410 is descending above or below the predefined period. For example, a message, an alert or other type of visual or audio signal can be provided to an operator or user of the gate mechanism 450, for example via a digital display 480 coupled to the control unit 460, indicating if the time is too fast or too slow and by how much (in terms or time, percentage, etc.). Further, the display 480 can provide instructions to the operator on how to position the gate arm 410 and adjust the counterweights 420 to meet the proper 20 second maximum descent time. If the gate is moving too fast (the arm 410 is too heavy), then the operator must move the counterweights 420 away from the gate mechanism 450. If the gate is moving too slowly, then the operator must move the counterweights 420 closer to the mechanism 450. Each time the counterweights 420 are adjusted, the operator may run the gate through the test cycle and continue adjusting the counterweights 420 until the gate arm 410 descends within the 20 second period.

Vertical Counterbalancing

To ensure the gate's vertical counterbalance is within specification, i.e. the gate 410 ascends without the motor 452 drawing more than a set maximum current level, which can be for example 15 amperes for a specific gate mechanism 450, the control unit 460 is configured to monitor an amount of motor current required to raise the arm 410. Like the process for determining the horizontal counterbalance level, the gate 410 can be run through a test cycle where the gate arm 410 is raised and, while the gate arm 410 is ascending from the zero to the 90 degree position, the control unit 460, e.g. the processor 462, measures or determines a maximum current that the motor 452 draws through the 90 degree transition.

If the current is too high, the control unit 460 is configured to output and display, for example on display 480, that the current level is above a predefined maximum current level and how much the current is out of tolerance (in terms of amperage, percentage, etc.). Further, the control unit 460 can be configured to provide instructions, via the display 480, to the operator on how to position the gate arm 410 and adjust the counterweights 420, so that the motor 452 is drawing not more than the maximum current level as defined by the manufacturer. If the gate motor 452 is drawing too much current (the arm 410 is too heavy), then the operator must move the counterweights 420 away from the gate mechanism 450. In some cases, an additional counterweight may need to be added. Each time the counterweights 420 are adjusted, the operator may run the gate through the test cycle and continue adjusting the counterweights 420 until the motor current is at an optimal level.

Figure 5:
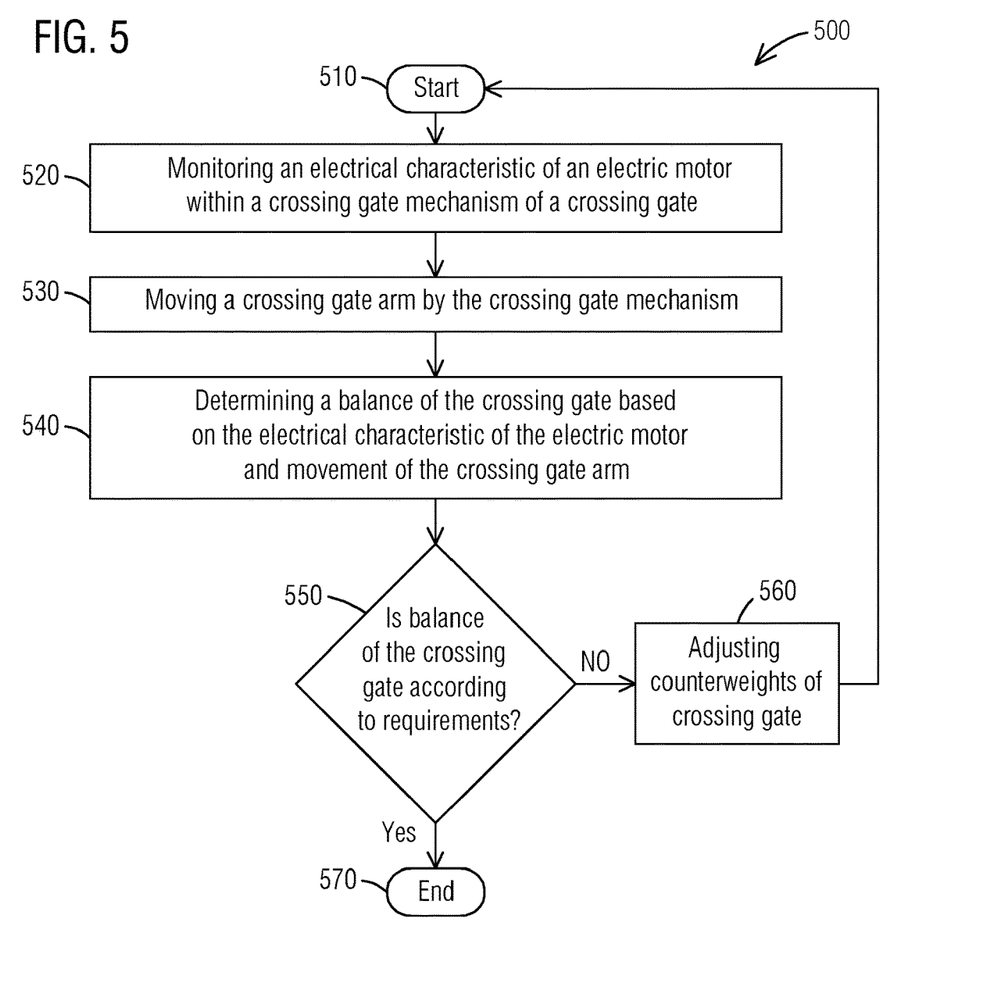
FIG. 5 illustrates a flow chart of a method of determining counterbalance and/or adjusting counterweights of a crossing gate arm in accordance with embodiments of the present disclosure.

FIG. 5 illustrates a flow chart of a method 500 of determining counterbalance and/or adjusting counterweights of a crossing gate arm in accordance with embodiments of the present disclosure. For example, the method 500 may be performed utilizing an automated counterbalance system 400 as described with reference to FIG. 4.

While the method 500 is described as a series of acts or steps that are performed in a sequence, it is to be understood that the method 500 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 500 starts at 510 and comprises an act 520 of monitoring an electrical characteristic of an electric motor within a crossing gate mechanism, an act 530 of moving a crossing gate arm by the crossing gate mechanism, and an act 540 of determining a counterbalance of the crossing gate arm based on the electrical characteristic of the electric motor and a movement of the crossing gate arm.

In an embodiment, the monitoring of the electrical characteristic (act 520) comprises monitoring a speed of the rotating part of the electric motor utilizing at least one sensing device coupled to the electric motor. The act 540 of determining the counterbalance of the crossing gate arm may comprise comparing the speed to an angular displacement of the crossing gate arm, such that the counterbalance of the crossing gate arm is determined by a motor rotation rate as a function of time. The motor rotation rate as a function of time provides whether the crossing gate arm is descending at a predefined period, wherein a signal is provided if the crossing gate arm is descending above or below the predefined period.

If the crossing gate arm is descending below or above (outside) the predefined period (timeframe), i.e. the counterbalance of the crossing gate is not according to requirements, act 550, the method 500 proceeds to act 560 of adjusting counterweights of the crossing gate arm, wherein the adjusting comprises moving the counterweights closer to or further away from the crossing gate mechanism. After adjustment of the counterweights, another cycle of acts 520, 530 and 540 is performed as many times as needed to achieve the proper counterbalance of the gate. If/when the crossing gate arm is descending within the predefined period and the counterbalance of the gate is acceptable, the method ends at 570.

In another embodiment, the monitoring of the electrical characteristic (act 520) comprises monitoring, e.g. measuring, a current draw of the electric motor utilizing at least one sensing device coupled to the electric motor. Further, a signal is provided and output if the current draw required to raise the crossing gate arm exceeds a maximum current level. If the current draw exceeds the maximum current level, the method 500 proceeds to act 560 of adjusting counterweights of the crossing gate arm, wherein the adjusting comprises moving the counterweights closer to or further away from the crossing gate mechanism. After adjustment of the counterweights, another cycle of acts 520, 530 and 540 is performed as many times as needed to achieve the proper balance of the gate. If/when the crossing gate arm is ascending within the predefined current limits and the counterbalance of the gate is acceptable, the method ends at 570.

In accordance with method 500 described with reference to FIG. 5, a non-transitory computer readable medium is provided, wherein the computer readable medium stores computer executable instructions which, when executed by a computer, perform a method comprising monitoring an electrical characteristic of an electric motor within a crossing gate mechanism while a crossing gate arm is moved by the crossing gate mechanism, and determining a counterbalance of the crossing gate arm based on the electrical characteristic of the electric motor during movement of the crossing gate arm.

It should be appreciated that acts associated with the above-described methodologies, features, and functions (other than any described manual acts) may be carried out by one or more data processing systems, such as for example control unit 460, via operation of at least one processor 462. As used herein, a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system.

The control unit 460 and/or processor 462 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

The invention claimed is:
1. An automated counterbalance system comprising:
a crossing gate mechanism comprising an electric motor with at least one sensing device and a motor control unit,
a crossing gate comprising a crossing gate arm and one or more counterweights, wherein the crossing gate arm is operated by the crossing gate mechanism,
wherein the at least one sensing device is configured to monitor an electrical characteristic of the electric motor, and
wherein the motor control unit comprises at least one processor and is configured to determine a counterbal- ance of the crossing gate based on the electrical characteristic of the electric motor and a movement of the crossing gate arm,
wherein the counterbalance of the crossing gate arm is determined by a motor rotation rate as a function of time, the motor rotation rate as a function of time providing whether the crossing gate arm is descending within or at a predefined period, and
wherein the motor control unit is configured to determine and output a signal in response to the crossing gate arm descending above or below the predefined period.

2. The automated counterbalance system of claim 1,
wherein the electric motor is a brushless direct current (DC) motor and the at least one sensing devices comprises a Hall sensor.

3. The automated counterbalance system of claim 1,
wherein the electrical characteristic of the electric motor comprises a speed of the rotating part of the electric motor.

4. The automated counterbalance system of claim 3,
wherein the motor control unit is configured to
determine the speed of the rotating part of the electric motor based on the electrical characteristic monitored by the at least one sensing device, and
compare the speed to an angular displacement of the crossing gate arm, such that the counterbalance of the crossing gate is determined by a motor rotation rate as a function of time.

5. The automated counterbalance system of claim 1,
wherein the electrical characteristic of the electric motor comprises a current draw of the crossing gate.

6. The automated counterbalance system of claim 5,
wherein the motor control unit is configured to
determine the current draw required to raise the crossing gate arm, the current draw comprising a maximum current level.

7. The automated counterbalance system of claim 6,
wherein the motor control unit is configured to determine and output a signal if the current draw exceeds the maximum current level.

8. A method of determining counterbalance and/or adjusting counterweights of a crossing gate, the method comprising:
monitoring an electrical characteristic of an electric motor within a crossing gate mechanism of a crossing gate,
moving a crossing gate arm by the crossing gate mechanism,
determining a counterbalance of the crossing gate based on the electrical characteristic of the electric motor and a movement of the crossing gate arm,
wherein the counterbalance of the crossing gate arm is determined by a motor rotation rate as a function of time, the motor rotation rate as a function of time providing whether the crossing gate arm is descending within or at a predefined period, and
determining and outputting, by a motor control unit, a signal in response to the crossing gate arm descending above or below the predefined period.

9. The method of claim 8,
wherein monitoring the electrical characteristic comprises monitoring a speed of the rotating part of the electric motor utilizing at least one sensing device coupled to the electric motor.

10. The method of claim 9, further comprising:
comparing the speed to an angular displacement of the crossing gate arm, such that the counterbalance of the crossing gate is determined by a motor rotation rate as a function of time.

11. The method of claim 8, further comprising:
adjusting counterweights of the crossing gate if the crossing gate arm is descending above or below the predefined period, the adjusting comprising moving the counterweights closer to or further away from the crossing gate mechanism.

12. The method of claim 8,
wherein monitoring the electrical characteristic comprises monitoring a current draw of the electric motor utilizing at least one sensing device coupled to the electric motor.

13. The method of claim 12, further comprising:
determining and outputting a signal if the current draw required to raise the crossing gate arm exceeds a maximum current level.

14. The method of claim 13, further comprising:
adjusting counterweights of the crossing gate if the crossing gate arm is descending above or below the predefined period, the adjusting comprising moving the counterweights closer to or further away from the crossing gate mechanism.

15. A non-transitory computer readable medium, storing computer executable instructions which, when executed by a computer, perform a method comprising:
monitoring an electrical characteristic of an electric motor within a crossing gate mechanism of a crossing gate while a crossing gate arm is moved by the crossing gate mechanism, and
determining a counterbalance of the crossing gate based on the electrical characteristic of the electric motor during movement of the crossing gate arm,
wherein the counterbalance of the crossing gate arm is determined by a motor rotation rate as a function of time, the motor rotation rate as a function of time providing whether the crossing gate arm is descending within or at a predefined period, and
determining and outputting a signal in response to the crossing gate arm descending above or below the predefined period.

16. The non-transitory computer readable medium of claim 15,
wherein monitoring the electrical characteristic comprises monitoring a speed and/or a current draw of the electric motor.

* * * * *